US005818453A

United States Patent [19]

Danby et al.

[11] Patent Number: 5,818,453

[45] Date of Patent: Oct. 6, 1998

[54] SYSTEM FOR EVALUATING PRINT QUALITY FOR A SHEET

[75] Inventors: Roger Danby, Arnprior; Ryan P. Moore, Braeside, both of Canada

[73] Assignee: Weavexx Corporation, Wake Forest, N.C.

[21] Appl. No.: 584,844

[22] Filed: Jan. 5, 1996

[51] Int. Cl.[6] .................................................... G06T 11/00

[52] U.S. Cl. .............................................................. 345/429

[58] Field of Search .................................... 395/128, 109, 395/129–132; 364/526, 470.02; 345/428–432

[56] References Cited

U.S. PATENT DOCUMENTS

| | | | |
|---|---|---|---|
| 3,767,900 | 10/1973 | Chao et al. | 364/151 |
| 3,788,137 | 1/1974 | Lyon et al. | 73/159 |
| 3,992,100 | 11/1976 | Lodzinski et al. | 356/73 |
| 4,308,553 | 12/1981 | Roetling | 358/507 |
| 4,616,217 | 10/1986 | Nesbilt et al. | 395/121 |
| 4,665,496 | 5/1987 | Ott | 364/526 |
| 4,812,879 | 3/1989 | Suzuki | 355/38 |
| 4,914,568 | 4/1990 | Kodosky et al. | 395/349 |
| 4,933,979 | 6/1990 | Suzuki et al. | 382/173 |
| 4,984,181 | 1/1991 | Kliman et al. | 395/129 |
| 5,016,183 | 5/1991 | Shyong | 364/470.02 |
| 5,027,196 | 6/1991 | Ono et al. | 358/527 |
| 5,097,427 | 3/1992 | Lathrop et al. | 395/130 |
| 5,314,581 | 5/1994 | Lin et al. | 162/263 |
| 5,371,851 | 12/1994 | Pieper et al. | 395/507 |
| 5,537,516 | 7/1996 | Sherman et al. | 395/109 |

OTHER PUBLICATIONS

"The Propagation of Light in Paper: Modelling and Monte Carlo Simulations" authored by J. Carlsson et al., pp. 83–86 of the *1995 International Paper Physics Conference,* held Sep. 11–14, 1995.

"Print Quality Improvement Through Co–Operation and Partnerships" by Roger Danby. Presented at *International Printing and Graphic Arts Conference,* Oct., 1994.

"The Impact of Forming Fabric Structures on Print Quality" by Roger Danby presented at Canadian Pulp & Paper Meeting, Jan., 1993 and published in Pulp & Paper Canada, Jan. 1994.

*Primary Examiner*—Almis R. Jankus
*Attorney, Agent, or Firm*—Myers Bigel Sibley & Sajovec, P.A.

[57] ABSTRACT

A computerized system simulates the absorption of ink into a sheet of paper. A portion closest to the print surface is scanned and a "sheet intensity value" is assigned to each pixel formed on the scanned image. A pre-formed printed screen image is laid over the scanned image of the sheet surface so that each pixel in the scanned image has a corresponding pixel in the print pattern. The sheet intensity value is subtracted from the print intensity value to obtain a final intensity value, which provides an indication of how ink will appear if it is applied to that pixel area of the sheet.

11 Claims, 4 Drawing Sheets

Microfiche Appendix Included
(1 Microfiche, 17 Pages)

SYSTEM FOR EVALUATING PRINT QUALITY FOR A SHEET

A microfiche appendix of computer program code, according to a preferred embodiment of the present invention, is attached hereto containing one (1) microfiche having seventeen (17) frames thereon.

BACKGROUND OF THE INVENTION

The invention relates to a system for evaluating the print quality that will be achieved with a paper surface.

Considerable work has e done over the past years to investigate the influence of forming fabric structures on the quality of the final print. It has been found that during the formation of a sheet of paper on a forming fabric structure, density differences are forced to occur. These density differences are increased during pressing, drying and calendering. When a uniform layer of ink is applied to the surface of the sheet of paper, the ink will penetrate at varying rates depending on the density of the sheet at the point of contact. This variation in penetration will result in a number of problems, including variations of gloss, offsetting and strike-through, to name but a few.

The worldwide trend to recycling, higher paper machine speeds, lighter basis weight, higher printing press speeds, lower printing press pressures, higher quality demands on advertising, and the use of four color printing, on not just one side, but two sides of the sheet, will put even greater demands on the need for better density uniformity of the sheet to be printed.

The invention is based on the discovery that print quality is directly related to the micro density of the surface of the sheet on the side that the printing ink is to be applied, and not the density variations of the whole sheet, as was previously believed. Studies have shown that when a sheet is split into a number of portions, many micro density differences can be found to exist at the portion closest to the surface, while the remaining internal body of the sheet can be seen to be very uniform. It is the micro density differences which occur at the surface of the sheet which cause non-uniformity in print quality.

The density differences in the sheet are caused by the relationship between raw material fiber lengths and filtering media hole sizes, as well as by the papermaking machine drainage forces. The shorter the fiber length and/or the larger the holes in the filtering medium, the greater the degree of micro density differences. These differences can directly affect final print quality through micro variations in ink penetration, which in turn, cause variations in half tone dot quality.

The perfect print is one in which all ink dots are perfectly round, and all are exactly alike, and absorb into the sheet at the same rate. This will happen only if the surface of the sheet on which each dot falls is perfectly uniform.

When ink is applied to an area of the sheet having low density, it will appear dull, or matte looking, because the ink is absorbed into the sheet. If the volume of ink is sufficient, it will strike through on the other side. However, when ink is applied to a high density area, the penetration of the ink is restricted. The ink stays closer to the surface, and produces a glossy print. To achieve the best print, the printer has to modify the printing conditions to strike a balance between the two extremes.

One method of evaluating the print quality of a sheet is to analyze the final product after it is printed. This method is expensive and time consuming. Furthermore, variables other than micro density differences in the sheet affect the print quality. When the final print is analyzed, it is impossible to tell whether defects are caused by micro density differences or by other factors. If the papermaker can identify the micro density differences at the mill, he can make the necessary adjustments to the fiber length, holes in the filtering medium, and drainage forces to produce a more uniform surface.

SUMMARY OF THE INVENTION

Thus, it is an object of the invention to provide a system for evaluating the print quality of a sheet before the ink is applied.

It is another object of the present invention to provide a means for determining how the density variations in a sheet will affect print quality.

It is another object of the invention to provide a system for simulating the variation in absorption of ink into the sheet before the ink is applied.

The invention accomplishes the objects set forth above by providing a computerized system for simulating the absorption of ink into a sheet. A sheet of paper is split into any number of portions. The portion closest to the print surface is scanned into a computer using either a high resolution scanner or a high resolution digitized video camera with a frozen image. The computer program uses the scan to generate an intensity picture of the micro density differences at the sheet surface.

The computer program assigns a "sheet intensity value" for each pixel formed on the scanned image. In one embodiment, the sheet intensity values range from a scale of 0 to 255, with 0 representing black (most dense) and 255 representing white (least dense).

After the sheet is scanned into the computer, a pre-formed printed screen image is generated into the computer. This can be accomplished using any computer program which is capable of generating a half tone dot pattern. The program generates the dot pattern using the same scale used to evaluate the sheet. The computer stores the "print intensity value" for each pixel in the pre-formed pattern.

The pre-formed printed screen image is then laid over the scanned image of the sheet surface so that each pixel in the scanned image has a corresponding pixel in the print pattern. Using the steps described below, the system is able to simulate the variation in absorption of the printing ink from the computer generated printed screen into the sheet.

The computer accesses both the sheet intensity value for a pixel on the sheet, and the print intensity value of a corresponding pixel on the pre-formed printed screen image. It subtracts the sheet intensity value from the print intensity value, and assigns a new value, referred to as the "final intensity value". The final intensity value for a pixel provides an indication of how ink will appear if it is applied to that pixel area of the sheet. For example, if the sheet intensity value for a particular pixel is 20 (indicating that the area in the sheet is dense) and the print intensity value of the corresponding pixel on the pre-formed print screen is 0 (representing black ink), the computer would subtract 20 from 0, and assign a final intensity value of −20. The final intensity value of −20 indicates that very little ink will be absorbed into the sheet. Therefore, if black ink were applied to that area of the sheet, the final color at that pixel would be very dark. However, if the sheet intensity value is match higher (i.e. 250, indicating that the area in the sheet has a very low density), the computer would subtract 250 from 0 and assign a final intensity value of −250. The final intensity value of −250 indicates that almost all of the ink at that pixel would be absorbed into the sheet. If black ink were applied to an area of a sheet having that rate of absorption, almost all of the ink would be absorbed into the page, and the printed area would appear to be almost white.

The computer repeats the steps set forth above for each pixel in the sheet. After it assigns a final intensity value for each pixel in the sheet, the computer uses the final intensity values to generate a representation of how the sheet would appear if the pre-printed pattern were applied to the sheet with ink. The papermaker is then able to make the necessary adjustments to the fiber length, holes in the filtering medium, and drainage forces to produce a sheet having a more uniform surface.

DETAILED DESCRIPTION OF THE PREFERRED EMBODIMENT

Figure 10:
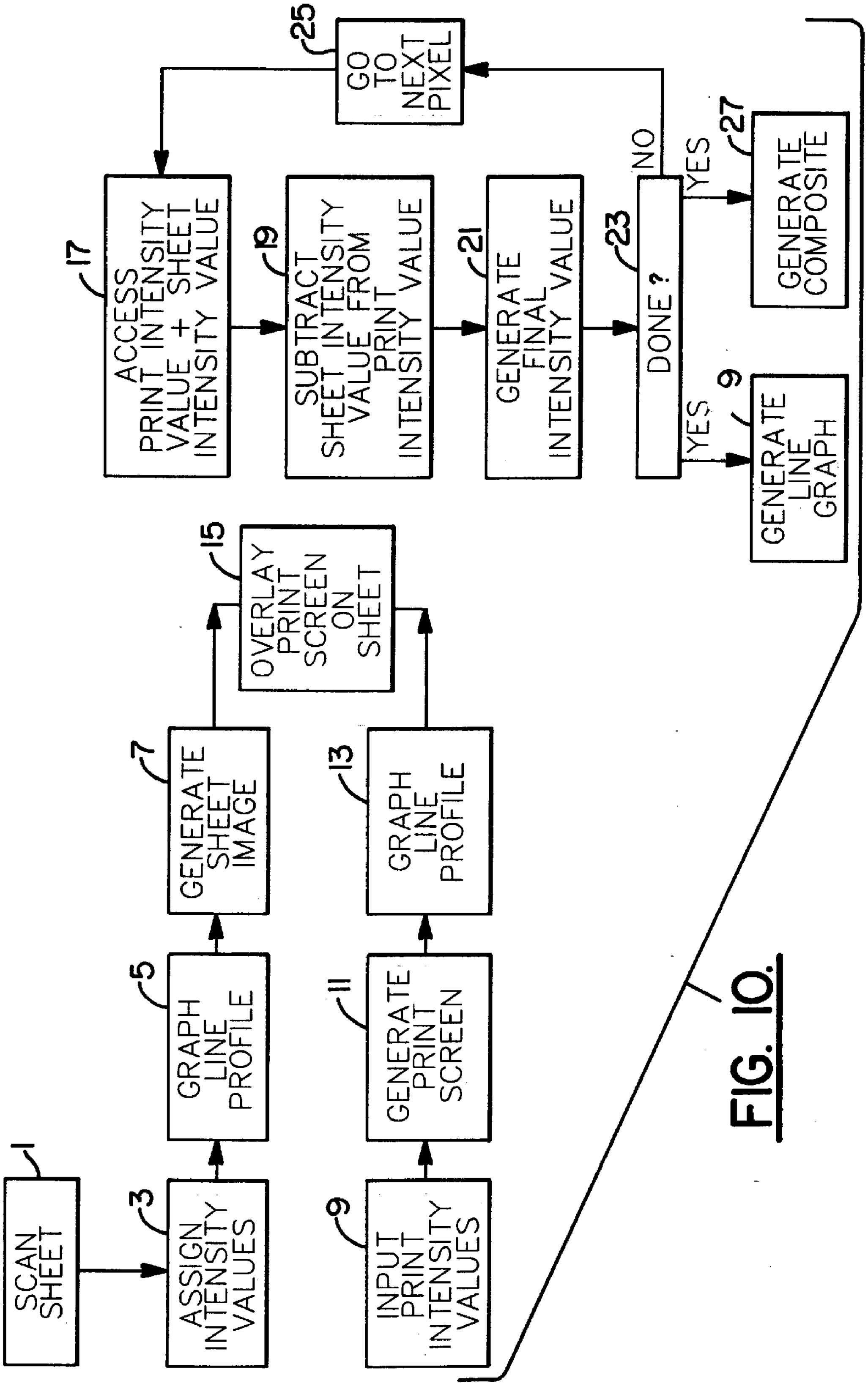
FIG. 10 is a flow chart of the computer program for the system.

The invention provides a computerized system for evaluating the print quality that will be achieved with a particular paper surface. The system stimulates the absorption of ink into a sheet. FIG. 10 shows a flow chart of the steps used in the program of the preferred embodiment.

The invention is based on the recognition that it is the micro density differences which occur closest to the surface of the sheet which affect the quality of print. To identify those differences, a sheet of paper is split into any number of portions. At step 1 of the program, the portion of the sheet which is closest to the printing surface is scanned into a computer using either a high resolution scanner or a high resolution digital video camera with a frozen image. The computer uses the scan to generate an intensity picture of the micro density differences of the sheet surface.

Figure 1:
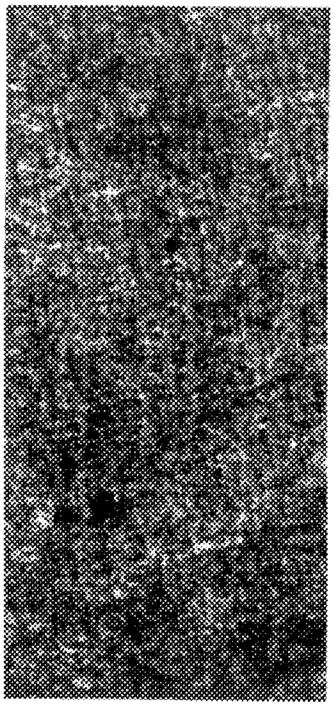
FIG. 1 shows a scanned image of a sheet.
Figure 4:
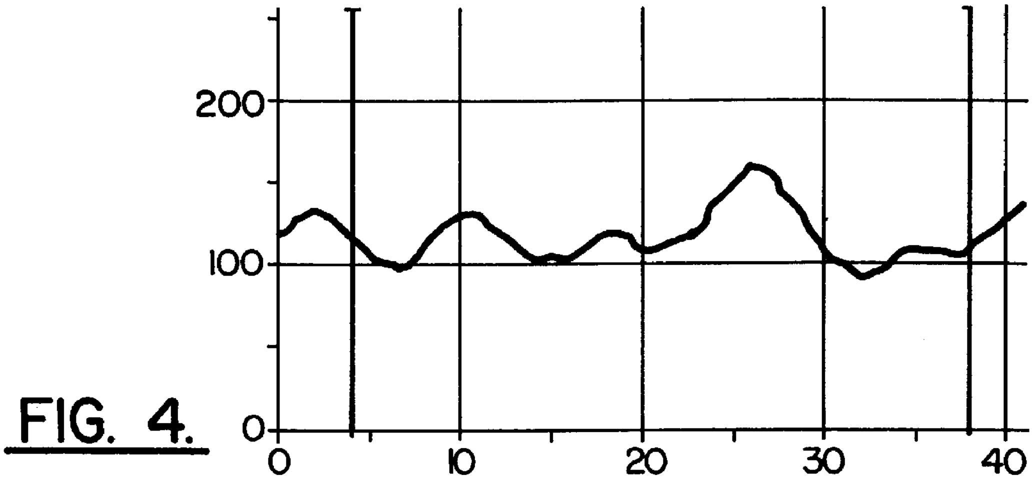
FIG. 4 is a graphic representation of a scanned line profile of a sheet.

At step 3 the computer program assigns a "sheet intensity value" for each pixel formed on the scanned image. In the preferred embodiment the sheet intensity values range from a scale of 0 to 255, with 0 representing black (most dense) and 255 representing white (least dense). At step 5, the computer uses the scale of 0 to 255 to generate a graphic representation, line by line, of the profile of the scanned sheet. At step 7 the computer generates an intensity picture, or sheet image, of the micro density differences of the sheet surface portion that was scanned into the computer. The less dense areas are shown in white, and the more dense areas are shown in black. FIG. 4 shows a graphic representation of a scanned line profile of the sheet shown in FIG. 1.

Figure 2:
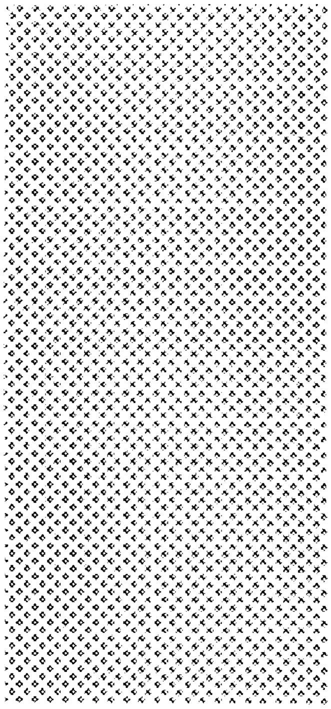
FIG. 2 shows a computer generated half tone dot pattern.

After the sheet is scanned into the computer, a pre-formed printed screen image (FIG. 2) is generated in the computer (steps 9 and 11). This can be accomplished using any computer program which is capable of generating a half tone dot pattern. At step 9 a series of print intensity values are input. The same scale which is used to evaluate the sheet is also used for the print intensity values. In the preferred embodiment, this is the scale of 0 to 255. At step 11, the program generates the dot pattern using those print intensity values. The computer stores the value of each pixel in the pre-formed print pattern as the "print intensity value".

Figure 5:
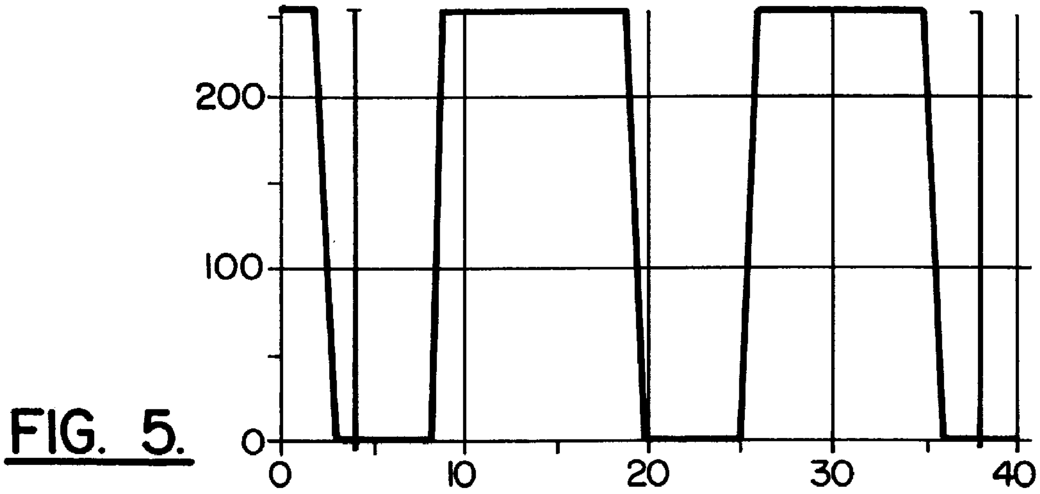
FIG. 5 is a graphic representation of a scanned line profile of 3 dots of a half tone dot pattern.

The half tone dot pattern can be a pattern having any number of lines per inch, percentage cover, and dot size. For example, the pre-formed printed screen shown in FIG. 2 has 100 lines per inch and 20 per cent cover. The half tone dot pattern can also be in color. At step 13, using the scale of 0 to 255, the computer generates a graphic representation of the print intensity values of the pre-formed printed screen image. FIG. 5 shows a graphic representation of a scanned line profile of 3 dots of the preformed printed pattern shown in FIG. 1.

At step 15 the pre-formed printed screen image is laid over the scanned image of the sheet surface so that each pixel in the scanned image has a corresponding pixel in the print pattern. Using the steps described below, the computer simulates the absorption of the printing ink from the printed screen into the sheet.

First, at step 17 the computer accesses both the sheet intensity value of a pixel of the sheet, and the print intensity value of a corresponding pixel of the pre-formed print screen. (A corresponding pixel of the pre-formed print screen is one which overlays the pixel of the scanned image of the sheet surface). Next, at step 19, the computer subtracts the sheet intensity value from the print intensity value. At step 21, the computer assigns a new value, referred to as the "final intensity value" which is the difference between the sheet intensity value and the print intensity value.

The final intensity value for a pixel provides an indication of how the ink would appear if it were applied to that pixel area of the sheet. For example, if the sheet intensity value for a particular pixel is 20 (indicating that the area is dense) and the print intensity value of the corresponding pixel of the pre-formed print screen is 0 (representing black ink), the computer would subtract 20 from 0, and assign a final intensity value of −20. The final intensity value of −20 indicates that very little ink will be absorbed into the sheet. Therefore, if black ink were applied to that area of the sheet, the final color at that pixel would be very dark. However, if the sheet intensity value is much higher (i.e. 250, indicating that the area has a very low density), the computer would subtract 250 from 0 and assign a final intensity value of −250. The final intensity value of −250 indicates that almost all of the ink at that pixel would be absorbed. If black ink were applied to an area of a sheet having that rate of absorption, almost all of the ink would be absorbed into the page, and the printed area would appear to be almost white. At step 23, the computer checks to see whether a final intensity value has been assigned for each pixel. If not, the computer repeats steps 17, 19 and 21 until a final print intensity has been assigned for each pixel (step 25).

The example shown below provides a comparison of the rate of absorption for three different areas on a sheet. The areas are represented by pixel locations X, Y and Z.

| Pixel Location | X | Y | Z |
|---|---|---|---|
| Original Print intensity | 0 | 0 | |
| Sheet intensity | 20 | 175 | 250 |
| Final print intensity | −20 | −175 | −250 |

In the example provide above, if ink is applied to the area at pixel X, very little of the ink will be absorbed into the sheet. At pixel Y, more ink will be absorbed, and at pixel Z, almost all of the ink will be absorbed. At pixel X, where there is very little absorption, the color would be very black. At Y, where there is more absorption, the color would be somewhat lighter, and at C, where there is almost 100 per cent absorption, the color would be almost white.

Figure 3:
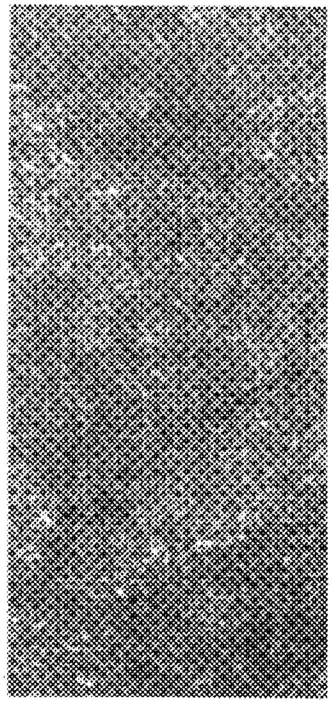
FIG. 3 is a computer generated representation of how the half tone dot pattern of FIG. 2 would appear if it were printed on the sheet shown in FIG. 1.
Figure 6:
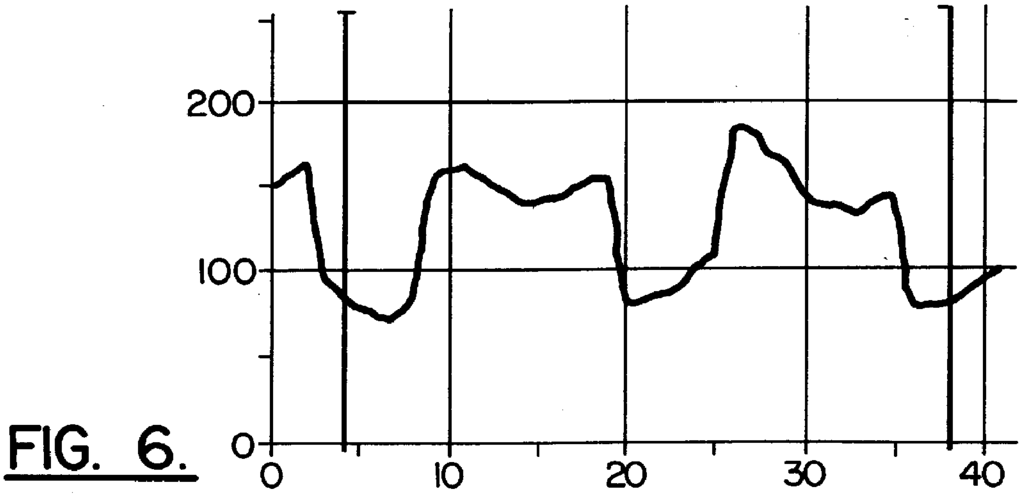
FIG. 6 is a graphic representation showing what the rate of absorption of ink would be if the pattern shown in FIG. 5 were applied to the sheet surface shown in FIG. 4.

After the computer assigns a final intensity value for a pixel, it uses the final intensity values to generate a picture of how the pre-printed pattern would appear if it were applied to the sheet with ink (step 27). For example, FIG. 3 shows how the half tone dot pattern of FIG. 2 would appear if it were applied to the sheet of FIG. 1. In addition, at step 29, the computer generates a graphic representation of the rate of absorption for a particular sheet. FIG. 6 shows what the rate of absorption of ink would be if the pattern shown in FIG. 5 were applied to the sheet surface shown in FIG. 4. The graphic representation can be displayed on the computer screen, or it can be printed.

Figure 7:
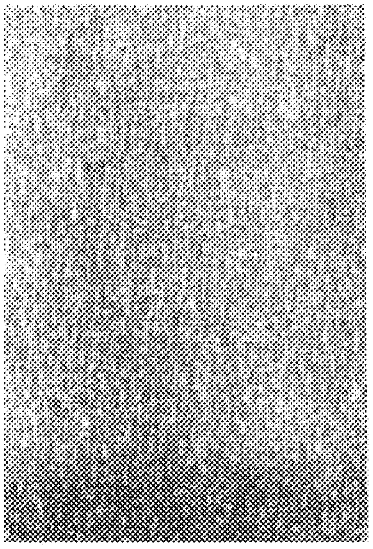
FIG. 7 shows a scanned image of another sheet.
Figure 8:
FIG. 8 shows a half tone dot pattern formed from an actual photograph.
Figure 9:
FIG. 9 is a computer generated representation of how the half tone dot pattern of FIG. 8 would appear if it were applied to the sheet shown in FIG. 7.

As noted above, the half tone dot pattern can be constructed from actual photographs. For example, FIG. 8 shows such a half tone dot pattern constructed from a photograph. FIG. 7 shows the scanned image of the sheet, and FIG. 9 shows how the photograph of FIG. 8 would appear if it were printed on the sheet of FIG. 7.

To generate a color dot pattern, four channels of a color photograph can be combined at different screen angles so that they minimize moire effects and overlap. Together they recreate the original image. In one embodiment, the colors cyan, magenta, yellow and black are used. They are then combined with a scan surface and the difference between these angles can be calculated. This illustrates which colors are more sensitive to wire marks.

The system described above provides an accurate means for evaluating the print quality of a sheet without the need for applying ink to the page. The evaluations can be performed at the paper mill, which allows the papermaker to make the necessary modifications to achieve a more uniform surface. Furthermore, with the present system it is possible to eliminate the effects of other variables on the print quality, which make it possible to obtain an accurate picture of the effects of the micro density differences on the sheet. The sheet samples are easy to prepare since only one scan is needed on a full sheet of paper.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and there is no intention to exclude any equivalents thereof. Hence, it is recognized that various modifications are possible within the scope of the present invention as claimed.

What is claimed is:

1. A system for evaluating the print quality to be achieved with a paper sheet surface before print is applied to said paper sheet surface comprising:

means for receiving a scanned image of the paper sheet, said scanned image comprising a plurality of pixels;

means responsive to said receiving means for assigning a sheet intensity value for each pixel in the scanned image;

means responsive to said assigning means for generating a print pattern having a plurality of pixels, each of said print pattern pixels having a known print intensity value;

means responsive to said generating means for overlaying the print pattern on the scanned image so that each pixel in the scanned image has a corresponding pixel in the print pattern;

means responsive to said overlaying means for subtracting the sheet intensity value for each pixel in the scanned image from the print intensity value of the corresponding pixel of the print pattern to generate a final intensity value for each pixel in the scanned image; and means responsive to said subtracting means for generating a representation of print absorption into said paper sheet using the final intensity values.

2. A system according to claim 1 wherein the sheet intensity values, the print intensity values and the final intensity values range from a scale of 0 to 255.

3. An apparatus for evaluating the print quality to be achieved with a paper sheet surface before print is applied to said paper sheet surface comprising:

a memory having a scanned image of the paper sheet, the scanned image comprising a plurality of pixels;

a logic circuit that assigns a sheet intensity value for each pixel of the scanned image;

a logic circuit that generates a print pattern having a plurality of pixels, each of said print pattern pixels having a known print intensity value;

a logic circuit that overlays the print pattern on the scanned image so that each pixel in the scanned image has a corresponding pixel in the print pattern;

a logic circuit that subtracts the sheet intensity value for each pixel in the scanned image from the print intensity value of the corresponding pixel of the print pattern to generate a final intensity value for each pixel in the scanned image; and a logic circuit that generates a representation of print absorption into the paper sheet using the final intensity values for each said pixel.

4. An apparatus according to claim 3 wherein the sheet intensity values, the print intensity values and the final intensity values range from a scale of 0 to 255.

5. A method for evaluating the print quality to be achieved with a paper sheet surface before print is applied to said paper sheet surface, said method comprising the steps of:

scanning the paper sheet into a data processor to form a scanned image comprising a plurality of pixels;

assigning a sheet intensity value for each pixel in the scanned image;

generating a print pattern having a plurality of pixels, each of said print pattern pixels having a known print intensity value;

overlaying the print pattern on the scanned image so that each pixel in the scanned image has a corresponding pixel in the print pattern;

subtracting the sheet intensity value for each pixel in the scanned image from the print intensity value of the corresponding pixel of the print pattern to generate a final intensity value for each pixel in the scanned image;

generating a representation of print absorption into the paper sheet using the final intensity values.

6. A method according to claim 5 further comprising the steps of:

splitting the paper sheet; and scanning a portion of the paper sheet closest to a print surface of the paper sheet into the data processor to form the paper sheet screen image.

7. A method according to claim 5 wherein the sheet intensity values, the print intensity values and the final intensity values range from a scale of 0 to 255.

8. A method according to claim 5 wherein said scanning step comprises scanning the paper sheet with a high resolution scanner.

9. A method according to claim 5 wherein said scanning step comprises scanning the paper sheet with a high resolution digital video camera.

10. A method of manufacturing paper sheet wherein print quality of a surface of said paper sheet is evaluated before print is applied to said surface, said method comprising the steps of:

scanning a portion of said paper sheet to form an image, said image comprising a plurality of pixels;

assigning a sheet intensity value for each pixel in the scanned image;

generating a print pattern having a plurality of pixels, each of said print pattern pixels having a known print intensity value;

overlaying the print pattern on the scanned image so that each pixel in the scanned image has a corresponding pixel in the print pattern;

subtracting the sheet intensity value for each pixel in the scanned image from the print intensity value of the corresponding pixel of the print pattern to generate a final intensity value for each pixel in the scanned image;

generating a representation of print absorption into the paper sheet using the final intensity values; and modifying micro density properties of said paper sheet based on said print absorption representation.

11. A method according to claim 10 wherein said step of modifying micro density properties comprises the steps of:

adjusting paper fiber length;

adjusting filtering medium holes; and adjusting drainage forces.

* * * * *